Oct. 22, 1929.  F. MOSSBERG  1,732,817
SPOOL
Filed Dec. 11, 1928
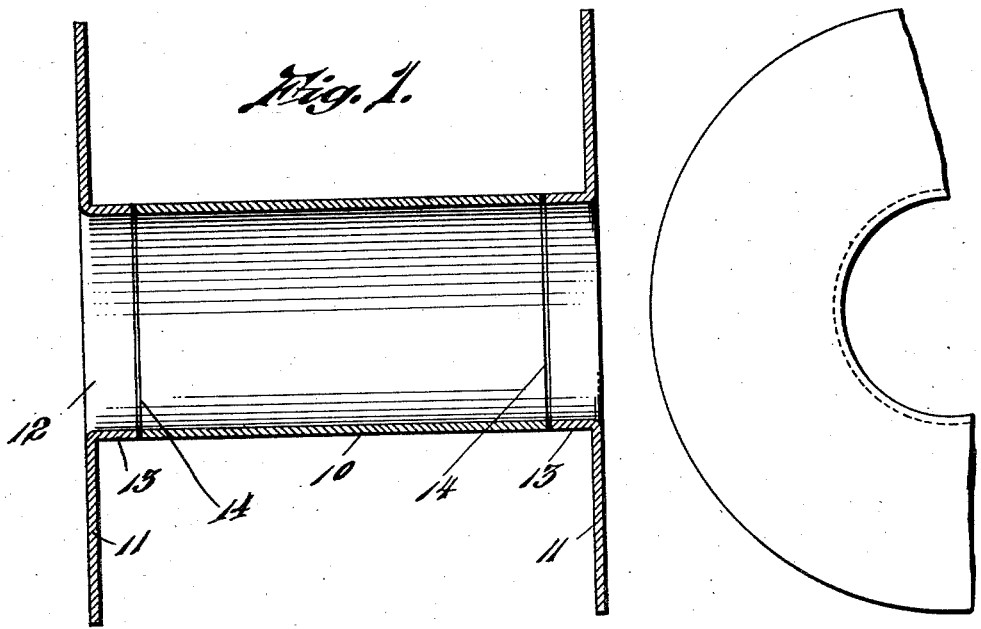
*Fig. 1.*
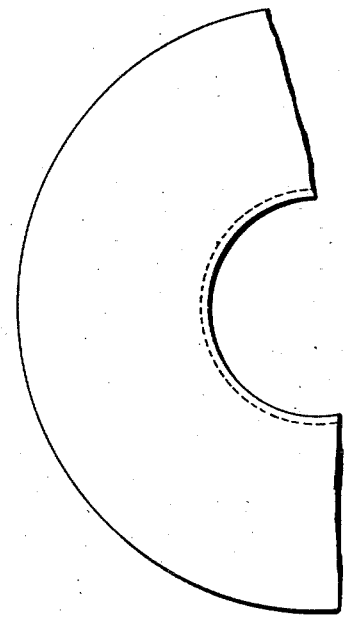
*Fig. 2.*
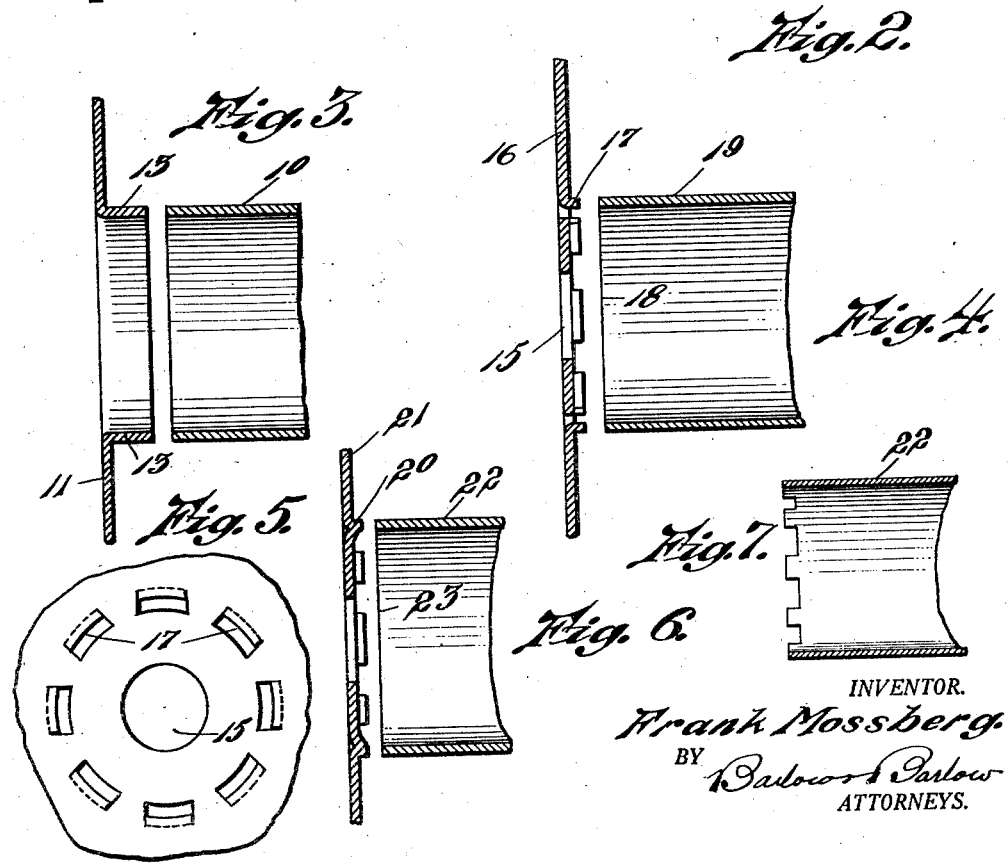
*Fig. 3.*  *Fig. 4.*  *Fig. 5.*  *Fig. 6.*  *Fig. 7.*
INVENTOR.
Frank Mossberg.
BY
ATTORNEYS.

Patented Oct. 22, 1929

1,732,817

UNITED STATES PATENT OFFICE

FRANK MOSSBERG, OF ATTLEBORO, MASSACHUSETTS, ASSIGNOR TO MOSSBERG PRESSED STEEL CORPORATION, OF ATTLEBORO, MASSACHUSETTS, A CORPORATION OF MASSACHUSETTS

SPOOL

Application filed December 11, 1928. Serial No. 325,275.

This invention relates to an improved construction of metal spools, and has for its object to provide the heads of such spools, each with an integral portion extending inwardly from the plane of its inner face against which extensions the ends of the body portion abut and are joined thereto by an electro welding operation.

A further object of the invention is to form a central opening thru the head with a portion of the stock at the edge of the hole turned inwardly forming a collar or flange portion of a diameter corresponding to that of the body and against which the end of the body abuts and is connected by an electric welding operation.

With these and other objects in view, the invention consists of certain novel features of construction, as will be more fully described, and particularly pointed out in the appended claims.

In the accompanying drawings:

Fig. 1 is a sectional view of one construction of my improved spool.

Fig. 2 is an end view showing the outer face of a portion of one of the heads of the spool.

Fig. 3 shows the head with an inturned collar portion and the body portion being of the same diameter as the collar portion and separated therefrom.

Fig. 4 is a modification showing a section thru one of the metal heads with spaced portions forced from the stock to extend inwardly from the inner face of the head against which the body member abuts to be welded thereto.

Fig. 5 is an end view of the construction illustrated in Fig. 4.

Fig. 6 is another modification showing portions of the stock of the head plate as forced inwardly from the inner face of the head at intervals about the head plate and against which the body member may abut to be connected by an electrical welding operation.

Fig. 7 is a sectional view of the end portion of the body showing its edge as being serrated.

It is found in practice in the construction of large metal spools, difficult to connect the body of the spool direct to the flat surface of the head plate, owing to the fact that an electric current will not properly flow therethru to produce the best electrical welding effect and that in order to produce a butt welded joint with the maximum strength, it is found to be of advantage to turn a portion or portions of the stock of the head inwardly and of a diameter corresponding to that of the body member and against which the end of the body member may abut to facilitate the performing of an electrical welding operation and produce a butt welded joint with the maximum strength; and the following is a detailed description of the present embodiment of my invention and showing the preferred constructions by which these advantageous results may be accomplished:—

With reference to the drawings, 10 designates the body of my improved metal spool which is preferably of a length less than the distance between the heads 11 thereof. These heads being preferably of a metal substantially the same thickness as that of the body member and owing to the fact that the electric current will not properly flow to form a joint if the ends of the body abut against the flat face of the head, I have formed a central opening 12 thru the head and have turned a portion of the stock of the head inwardly forming a collar or flange portion 13 extending inwardly from the inner face of the head, both the inner and outer diameters of which are substantially the same as that of the body portion 10, against these collar portions 13, the ends of the body 10 are arranged to abut and by properly applying the terminal of the butt welding machine to the surfaces adjacent the joint to be welded, I am enabled to perform a butt welding operation in a simple and effective way which will produce a joint 14 of maximum strength.

In some instances, instead of forming the opening thru the head of the same diameter as the inner diameter of the body member, I may, as illustrated in Fig. 4, provide a smaller opening 15 thru the head 16 and cut and swage portions of the stock as at 17, at close intervals about the head, to extend inwardly and against which the end 18 of the barrel or body 19 may abut to be welded thereto. I have also shown another modification, Fig. 6, wherein spaced inwardly projecting portions 20 may be formed on the inner face of the head plate 21 without piercing the head plate and against which the end 22 of the body 23 may abut to be welded to the head plate.

My improved construction of metal spool wherein inwardly-extending portions of the head plate are provided and against which the ends of the body abut to be electrically welded thereto produces a very strong and durable spool with a welded joint of maximum strength.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A spool comprising a body portion with a head member at each end, each of said head members having an integral portion extending inwardly from the plane of its inner face, the ends of the body abutting against said inwardly-extending portions and electrically welded thereto.

2. A spool comprising a body portion with a head member at each end, each of said head members having a central opening with a portion of the stock at the edge of the opening turned inwardly forming a collar portion on the inner face of the head of a diameter corresponding to that of the body, the ends of the body abutting against said collar portions and being electrically welded thereto.

3. A spool having a body portion with head members at each end thereof, the length of the body being less than the distance between its heads and portions of the heads extending inwardly to meet and abut against the ends of the body and being electrically welded thereto.

4. A spool comprising a body member with a head member at each end thereof, the length of the body member being less than the distance between the head members, portions of said head members projecting inwardly to meet and abut against the ends of the body member, the abutting edges of one of said members being serrated and the two being electrically butt welded together.

In testimony whereof I affix by signature.

FRANK MOSSBERG.